United States Patent

Schmerling

[15] 3,679,759

[45] July 25, 1972

[54] PREPARATION OF PRIMARY ALKYL HALIDES

[72] Inventor: Louis Schmerling, Riverside, Ill.

[73] Assignee: Universal Oil Products Company, Des Plaines, Ill.

[22] Filed: Aug. 28, 1968

[21] Appl. No.: 755,790

[52] U.S. Cl. .................................................. 260/663
[51] Int. Cl. ............................................. C07c 17/08
[58] Field of Search .................................... 260/663

[56] References Cited

UNITED STATES PATENTS 1,087,961    2/1914    Masland ............................ 260/663

2,819,319    1/1958    Barnes ............................... 260/663

FOREIGN PATENTS OR APPLICATIONS 29,962    0/1912    Great Britain ..................... 260/663

*Primary Examiner*—Daniel D. Horwitz
*Attorney*—James R. Hoatson, Jr. et al.

[57] ABSTRACT

Primary alkyl halides are prepared by reacting a 1-alkene with an aqueous hydrohalic acid at an elevated temperature above about 200° C. to prepare alkyl halides in which the halogen substituent is in a primary position.

9 Claims, No Drawings

PREPARATION OF PRIMARY ALKYL HALIDES

This invention relates to a process for the preparation of alkyl halides and particularly to a process for the preparation of primary alkyl halides.

Primary alkyl halides will find a wide variety of use as intermediates in the preparation of many organic compounds, particularly when a straight-chain primary alkyl substituent is an important and necessary component of the final product. For example, primary alkyl halides may be converted to primary alcohols, primary amines, fatty acids, n-alkane-sulfonic acids and other desirable compounds.

Heretofor, primary alkyl bromides have been prepared by a free radical induced reaction, thus requiring the presence of a free radical generating catalyst such as peroxides or other free radical generating compounds. However, it has now been discovered that primary alkyl bromides and even chlorides may be prepared in a thermal manner thus obviating the necessity of an extraneous catalytic compound in the reaction mixture.

It is therefore an object of this invention to provide a process for the preparation of primary alkyl halides.

A further object of this invention is to provide a process for preparing primary alkyl halides in a thermal manner of operation without requiring the presence of an additional catalytic compound.

One aspect of this invention may be found in a process for the preparation of a primary alkyl halide which comprises treating a 1-alkene with an aqueous hydrohalic acid at an elevated temperature above about 200° C. and recovering the resultant primary alkyl halide.

Another aspect of this invention is found in a process for the preparation of a primary alkyl halide which comprises treating propylene with an aqueous hydrochloric acid at a temperature above about 200° C. and recovering the resultant n-propyl chloride.

Other objects and embodiments will be found in the following further detailed description of the present invention.

As hereinbefore set forth, the present invention is concerned with a process for the thermal hydrohalogenation of 1-alkenes in the presence of an aqueous hydrohalic acid whereby primary alkyl halides are obtained. For example, by utilizing the process of this invention, it is possible to obtain a 1-halodecane, 1-halododecane, 1-halotetradecane or 1-halohexadecane.

The reaction is carried out in a thermal manner at elevated temperatures, said temperature being above about 200° C. and preferably in a range of from 200° C. to about 300° C. The hydrohalogenation may be effected at atmospheric pressure or at superatmospheric pressures ranging from 2 to about 100 atmospheres. If superatmospheric pressures are to be employed, the desired operating pressure is the autogenous pressure or is provided for by the introduction of an inert gas such as nitrogen into the reaction zone, the amount of pressure which is used being that which is sufficient to maintain a major portion of the reactants in the liquid phase.

As hereinbefore set forth, the process is effected by treating or reacting a 1-alkene with an aqueous solution of a hydrohalic acid, the preferred hydrohalic acids being hydrogen chloride and hydrogen bromide. It is also contemplated within the scope of this invention that the 1-alkene may be reacted with aqueous solutions of hydrofluoric acid or hydroiodic acid. However, hydrochloric acid and hydrobromic acid are the preferred reactants due to the ease of handling and the reactivities of the products obtained. The preferred aqueous hydrohalic acids will contain hydrochloric acid in an amount ranging from about 15 to about 38 percent concentration and hydrobromic acid ranging from about 10 to about 48 percent concentration. As will hereinafter be set forth in greater detail, it is necessary that the hydrohalic acid be in an aqueous solution, anhydrous hydrohalic acids yielding different products than the desired primary alkyl halides.

Examples of 1-alkenes which may be reacted with the aforementioned aqueous hydrohalic acids are those containing from three to about 20 carbon atoms and will include propylene, 1-butene, 1-propene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, etc.

The process of this invention may be effected in any suitable manner and may comprise either a batch or continuous type operation. For example, when a batch type operation is used, a quantity of the 1-alkene which is to be hydrohalogenated is placed in an appropriate apparatus such as, for example, a stirred reaction flask, or if superatmospheric pressures are to be employed, an autoclave of the rotating or mixing type. In addition, the hydrohalic acid in aqueous solution is also placed in the reaction vessel which is thereafter sealed, pressured to the operating pressure if so desired, and heated to the predetermined operating temperature. After maintaining the vessel at the desired operating temperature and pressure for a predetermined residence time, which may range from about 0.5 up to about 10 hours or more in duration, the apparatus and contents thereof are cooled to room temperature. Any excess pressure, if present, is discharged, following which the reaction mixture is recovered and subjected to separation means whereby the organic layer is separated from the aqueous layer. The former is then subjected to conventional means of separation and purification whereby the desired primary alkyl halide is recovered.

It is also contemplated that the halogenation of the 1-alkene to provide primary alkyl halides may be effected in a continual manner of operation. When such a type of operation is used, the starting materials comprising the 1-alkene and the hydrohalic acid are continuously charged to a reaction vessel which is maintained at the proper operating conditions of temperature and pressure. The reactants may be charged to the vessel through separate lines or, if so desired, said reactants may be admixed prior to entry into said reactor and the resulting mixture charged thereto in a single stream. Upon completion of the desired residence time, the reactor effluent is continuously withdrawn and subjected to separation means whereby the hydrohalic acid in aqueous solution is separated from the organic layer and recycled to form a portion of the feed stock. The organic layer is also subjected to conventional separation means whereby the desired primary alkyl halide is separated from any side reactions which may have occurred and unreacted 1-alkene, the former also being recycled to form a portion of the feed stock.

Examples of primary alkyl halides which may be prepared according to the process of this invention include n-propyl chloride, n-propyl bromide, 1-chlorobutane, 1-bromobutane, 1-chloropentane, 1-bromopentane, 1-chlorohexane, 1-bromohexane, 1-chloroheptane, 1-bromoheptane, 1-chlorooctane, 1-bromooctane, 1-chlorononane, 1-bromononane, 1-chlorodecane, 1-bromodecane, 1-chloroundecane, 1-bromoundecane, 1-chlorododecane, 1-bromododecane, 1-chlorotridecane, 1-bromotridecane, 1-chlorotetradecane, 1-bromotetradecane, 1-chloropentadecane, 1-bromopentadecane, 1-chlorohexadecane, 1-bromohexadecane, 1-chloroheptadecane, 1-bromoheptadecane, 1-chlorooctadecane, 1-bromooctadecane, 1-chlorononadecane, 1-bromononadecane, 1-chloroeicosane, 1-bromoeicosane, etc.

The following examples are given to illustrate the process of the present invention which, however, are not intended to limit the generally broad scope of the present invention in strict accordance therewith.

EXAMPLE I

In this example 59 grams of an aqueous solution of hydrochloric acid (23% HCl) was placed in the glass liner of a rotating autoclave. The autoclave was sealed, 50 grams of propylene was added, and nitrogen was pressed in until an initial pressure of 30 atmospheres was reached. The autoclave was then heated to a temperature of 225° C. and maintained thereat for a period of 8 hours, the pressure during this time rising to 92 atmospheres. At the end of the 8-hour time period, the autoclave was allowed to return to room temperature, the final pressure at room temperature being 30 atmospheres. The excess pressure was discharged and the reaction product which comprised two water-white layers was recovered. The aqueous layer was separated from the organic layer and the latter was recovered. Gas-liquid chromatographic analysis of this layer showed the presence of 16 percent n-propyl chloride.

To illustrate the necessity for effecting the reaction at temperatures in excess of 200° C., a similar experiment was performed in which 91 grams of an aqueous hydrochloric acid solution (37–38% HCl was placed in the glass liner of a rotating autoclave. The autoclave was sealed, 50 grams of propylene was added, and nitrogen was pressed in until an initial pressure of 30 atmospheres was reached. The autoclave was then heated to a temperature of 100° C. and maintained thereat for a period of 8 hours, during which time the pressure rose to 51 atmospheres. At the end of this time, heating was discontinued and the autoclave allowed to return to room temperature, the final pressure at room temperature being 30 atmospheres. The excess pressure was discharged and the reaction product was recovered. The aqueous layer was separated from the organic layer and the latter subjected to gas-liquid chromatographic analysis. The analysis disclosed the presence of isopropyl chloride with no n-propyl chloride being present.

EXAMPLE II

In this experiment 20 grams of concentrated hydrobromic acid (15.5% HBr) was placed in the glass liner of a rotating autoclave. The autoclave was sealed and 50 grams of propylene was added, after which nitrogen was pressed in until an initial pressure of 30 atmospheres was reached. The autoclave was then heated to a temperature of 225° C. and maintained thereat for a period of 1 hour, the pressure during this period rising to 74 atmospheres. At the end of 1 hour, heating was discontinued and the autoclave was allowed to return to room temperature, the final pressure at room temperature being 30 atmospheres. The excess pressure was discharged. The reaction mixture was recovered, the aqueous layer was separated from the organic layer and the latter subjected to a gas-liquid chromatographic analysis. This analysis disclosed the presence of 26 percent n-propyl bromide.

To illustrate the fact that the formation of n-propyl bromide was not caused by a free radical induced reaction, an additional experiment was performed in which 50 grams of propylene, 106 grams of concentrated hydrobromic acid containing 48 percent hydrogen bromide and 2 grams of hydroquinone were heated to a temperature of 225° C. under 30 atmospheres initial nitrogen pressure in an autoclave. The autoclave was maintained at 225° C. for a period of 8 hours, during which time the pressure reached a maximum of 85 atmospheres. At the end of this time, heating was discontinued and the autoclave allowed to return to room temperature, the final pressure at room temperature being 30 atmospheres. The excess pressure was discharged, the autoclave was opened and the reaction product recovered. After separating the organic layer from the aqueous layer, the former was subjected to gas-liquid chromatograph analysis which disclosed the presence of 29 percent n-propyl bromide. Therefore, it was shown that the formation of n-propyl bromide was not caused by a free radical-induced reaction inasmuch as there was no decrease (actually a slight increase) of the yield of n-propyl bromide isomer when contrasted with affecting the reaction in the absence of any free-radical chain inhibitor.

EXAMPLE III

In this experiment 38 grams of 1-pentene and 50 grams of an aqueous hydrochloric acid containing 38 percent of a hydrochloric acid were placed in the glass liner of a rotating autoclave. The autoclave was sealed and nitrogen pressed in until an initial pressure of 30 atmospheres was reached. The autoclave was then heated to a temperature of 225° C. and maintained thereat for a period of 8 hours, the pressure rising to a maximum of 70 atmospheres during this period. At the end of this time, heating was discontinued and the autoclave allowed to return to room temperature, the final pressure at room temperature being 30 atmospheres. The excess pressure was discharged, the autoclave was opened, and the reaction product recovered. The organic layer w as separated from the aqueous layer and subjected to gas-liquid chromatograph analysis. This analysis disclosed the presence of n-pentyl chloride.

EXAMPLE IV

In this example 56 grams (0.5 mole) of 1-octene and 36.5 grams (1.0 mole) of of a concentrated hydrochloric acid is placed in the glass liner of a rotating autoclave. The autoclave is sealed and nitrogen is pressed in until an initial pressure of 25 atmospheres is reached. Following this, the autoclave is heated to a temperature of 225° C. and maintained thereat for a period of 8 hours. At the end of this time, the autoclave is allowed to cool to room temperature, the excess pressure is discharged, and the autoclave is opened. The reaction product is recovered and the organic layer is separated from the aqueous layer. Gas-liquid chromatographic analysis of the organic layer will disclose the presence of 1-chlorooctane.

EXAMPLE V

In this example 28 grams of 1-butene and 81 grams of a concentrated hydrobromic acid containing 48 percent hydrogen bromide are treated in a manner similar to that set forth in the above examples, that is, the reaction mixture is heated at a temperature of 225° C. under an initial pressure of 30 atmospheres of nitrogen for a period of 8 hours. At the end of this time, the reaction mixture is recovered and the organic layer after separation from the aqueous layer is subjected to gas-liquid chromatograph analysis. This analysis will disclose the presence of 1-bromobutane.

EXAMPLE VI

A mixture of 70 grams of 1-decene and 36.5 grams of concentrated hydrochloric acid is placed in the glass liner of a rotating autoclave which is thereafter sealed and nitrogen pressed in until an initial pressure of 30 atmospheres is reached. The autoclave is then heated to a temperature of 250° C. and maintained thereat for a period of 8 hours. At the end of this time, heating is discontinued and the autoclave allowed to return to room temperature. The excess pressure is vented and the autoclave is opened. The reaction mixture is recovered and the organic layer is separated from the aqueous layer. Analysis of this organic layer by means of a gas-liquid chromatograph will disclose the presence of 1-chlorodecane.

EXAMPLE VII

In this example a mixture of 84 grams of 1-dodecene and 81 grams of a concentrated hydrobromic acid containing 48 percent hydrogen bromide is placed in the glass liner of a rotating autoclave which is thereafter treated in a manner hereinbefore set forth in the preceding examples. After pressuring the autoclave with nitrogen, heating to a temperature of 250° C. and maintaining the autoclave at this temperature and pressure for 8 hours, heating is discontinued. After the autoclave is cooled to room temperature, the excess pressure is vented and the reaction product is recovered. The organic layer is separated from the aqueous layer and subjected to a gas-liquid chromatograph analysis. This analysis will disclose the presence of 1-bromododecane.

I claim as invention:

1. A process for the preparation of a primary alkyl halide which comprises treating a 1-alkene with an aqueous hydrohalic acid at an elevated temperature above about 200°

C. and a pressure sufficient to maintain a major portion of the reactants in the liquid phase, said acid being selected from the group consisting of hydrochloric acid containing from about 15 to about 38 percent HCl and hydrobromic acid containing from about 10 to about 48 percent HBr, and recovering the resultant primary alkyl halide.

2. The process as set forth in claim 1 in which said aqueous hydrohalic acid is hydrochloric acid.

3. The process as set forth in claim 1 in which said aqueous hydrohalic acid is hydrobromic acid.

4. The process as set forth in claim 2 in which said 1-alkene comprises propylene and said primary alkyl halide comprises n-propyl chloride.

5. The process as set forth in claim 3 in which said 1-alkene comprises propylene and said primary alkyl halide comprises n-propyl bromide.

6. The process as set forth in claim 3 in which said 1-alkene comprises 1-butene and said primary alkyl halide comprises 1-bromobutane.

7. The process as set forth in claim 2 in which said 1-alkene comprises 1-octene and said primary alkyl halide comprises 1-chlorooctane.

8. The process as set forth in claim 2 in which said 1-alkene comprises 1-decene and said primary alkyl halide comprises 1-chlorodecane.

9. The process as set forth in claim 3 in which said 1-alkene comprises 1-dodecene and said primary alkyl halide comprises 1-bromododecane.

* * * * *